US007466371B2

(12) United States Patent
Matsuda

(10) Patent No.: US 7,466,371 B2
(45) Date of Patent: Dec. 16, 2008

(54) LIQUID CRYSTAL DISPLAY DEVICE

(75) Inventor: Hiroshi Matsuda, Gifu (JP)

(73) Assignee: Epson Imaging Devices Corporation, Nagano (JP)

( * ) Notice: Subject to any disclaimer, the term of this patent is extended or adjusted under 35 U.S.C. 154(b) by 302 days.

(21) Appl. No.: 11/528,421

(22) Filed: Sep. 28, 2006

(65) Prior Publication Data

US 2007/0076136 A1 Apr. 5, 2007

(30) Foreign Application Priority Data

Sep. 30, 2005 (JP) ............................ 2005-288896

(51) Int. Cl.
*G02F 1/136* (2006.01)

(52) U.S. Cl. ........................................................ 349/43

(58) Field of Classification Search .................. 349/43, 349/44, 40, 107, 110
See application file for complete search history.

(56) References Cited

U.S. PATENT DOCUMENTS 6,175,395 B1 * 1/2001 Yamazaki et al. ............. 349/44
6,815,903 B2 * 11/2004 Nakanishi ................ 315/169.3
2002/0101547 A1 * 8/2002 Lee et al. ....................... 349/40
2003/0146710 A1 * 8/2003 Nakanishi ................ 315/169.3

FOREIGN PATENT DOCUMENTS

JP 2003-241683 8/2003

* cited by examiner

*Primary Examiner*—Quyen P Leung
(74) *Attorney, Agent, or Firm*—Morrison & Foerster LLP

(57) ABSTRACT

The invention is directed to narrowing a frame of a liquid crystal display device including a display pixel region and a dummy pixel region adjacent thereto. The display pixel region including a plurality of pixels each having a pixel selection TFT and a pixel electrode connected thereto is formed on a first substrate. The dummy pixel region including a plurality of dummy pixels each having a pixel selection TFT and a pixel electrode connected thereto and shielded from light by a black matrix is formed adjacent to the display pixel region. A driving TFT, that is, a sampling TFT is further formed being superposed on the pixel electrode of the dummy pixel. That is, the pixel electrode of the dummy pixel is superposed on at least a portion of a channel region of the sampling TFT with a planarization insulation film interposed therebetween.

4 Claims, 3 Drawing Sheets

LIQUID CRYSTAL DISPLAY DEVICE

CROSS-REFERENCE OF THE INVENTION

This invention is based on Japanese Patent Application No. 2005-288896, the content of which is incorporated herein by reference in its entirety.

BACKGROUND OF THE INVENTION

1. Field of the Invention

The invention relates to a liquid crystal display device, particularly to a liquid crystal display device having a display pixel region and a dummy pixel region adjacent thereto.

2. Description of the Related Art

A display device formed with a display pixel region formed with a plurality of pixels as liquid crystal display pixels and a dummy pixel region including dummy pixels that do not contribute to a display on a glass substrate has been conventionally known. A description will be given referring to such a display device as a "liquid crystal display device" hereafter.

A general description of the conventional liquid crystal display device will be given referring to FIG. 3. FIG. 3 is a plan view of this liquid crystal display device, showing a display pixel region 10A and its vicinity that will be described below. Data lines 2 supplying a display signal D and scanning lines 3 supplying a pixel selection signal G are formed in a grid form on a first substrate 1P that is one of two glass substrates forming the liquid crystal display device as shown in FIG. 3. A plurality of pixels 10 is respectively formed in regions surrounded by the data lines 2 and the scanning lines 3 as liquid crystal display pixels. A pixel selection thin film transistor (hereafter, abbreviated to "TFT") 11 connected to the data line 2 and the scanning line 3 and a pixel electrode 12 connected to the pixel selection TFT 11 are formed in each of the pixels 10. The pixel 10 includes a pair of alignment films, a second substrate, a common electrode, a second alignment film, a liquid crystal layer, a retardation plate, a polarizing plate, and so on although not shown, forming the liquid crystal display pixel. A description will be given referring to a region formed with these pixels 10 as a display pixel region 10A hereafter.

Furthermore, a dummy pixel region 20A including a plurality of dummy pixels 20 is formed in a region adjacent to the display pixel region 10A on the first substrate 1P in this liquid crystal display device. The dummy pixel 20 has the structure of the pixel 10 described above and is shielded from light by a black matrix (not shown). That is, the dummy pixels 20 do not contribute to an actual display.

The formation of this dummy pixels 20 adjacent to the display pixel region 10A prevents nonuniform formation of layers forming the pixels 10 in an end portion of the display pixel region 10A and thus achieves uniform pixel formation at the end portion that are comparable with other pixels 10. That is, a difference in film thickness between the pixels 10 in the end portion and the pixels 10 on the inner side from the end portion is reduced. The dummy pixel 20 has the same electric structure as that of the pixel 10. Therefore, the electric characteristics of the pixels 10 in the end portion do not differ from those of the pixels 10 on the inner side from the end portion.

Driving TFTs sending a driving signal to the pixel selection TFTs in response to a predetermined synchronizing signal are formed adjacent to the dummy pixels 20 in a region outside the dummy pixel region 20A. The driving TFTs herein are, for example, sampling TFTs 60 supplying a display signal D that is one of the driving signals to the data lines 2. The plurality of sampling TFTs 60 is included in a horizontal driving circuit 101 serving as a driving circuit. A vertical driving circuit 102 including driving TFTs supplying a pixel selection signal G is connected to the scanning lines 3, although not shown.

Next, an operation of the liquid crystal display device will be described. First the pixel selection TFT 11 turns on in response to a pixel selection signal G supplied to the scanning line 3 through the driving TFT of the vertical driving circuit 102. Then, a display signal D supplied to the data line 2 through the driving TFT of the horizontal driving circuit 101, i.e., the sampling TFT 60, is supplied to the pixel electrode 12 through the pixel selection TFT 11. At this time, a light transmission amount of a liquid crystal layer (not shown) of the pixel 10 changes in response to the display signal D, and display light is outputted from the pixel 10 corresponding to the light transmission amount. While the dummy pixel 20 outputs display light similarly to the pixel 10, the display light is not visually recognized by a viewer since it is shielded from light by the black matrix.

The relevant technology is disclosed in the Japanese Patent Application Publication No. 2003-241683.

In the described liquid crystal display device, however, the driving TFTs, i.e., the sampling TFTs 60, need be formed in a frame of the first substrate 1P (i.e., on an end portion of the first substrate 1P where the pixels 10 or the dummy pixels 20 are not formed). Therefore, the frame of the liquid crystal display device requires the space to accommodate those device elements.

SUMMARY OF THE INVENTION

The invention provides a liquid crystal display device that includes a first substrate, a plurality of display pixels formed on the first substrate to form a display pixel region and a plurality of dummy pixels formed on the first substrate to form a dummy pixel region adjacent the display pixel region. Each of the display pixels includes a pixel selection transistor and a pixel electrode connected with the pixel selection transistor. Each of the dummy pixels includes a pixel selection transistor and a pixel electrode connected with the pixel selection transistor and is covered by a black matrix to prevent light emission from the dummy pixels. The device also includes a driving transistor formed on the first substrate and supplying a driving signal to the pixel selection transistors of the display pixels. A portion of a channel region of the driving transistor is disposed under part of a pixel electrode of a corresponding dummy pixel. The device further includes an insulation film disposed between the driving transistor and the pixel electrodes of the display and dummy pixels, a second substrate, and a liquid crystal layer disposed between the pixel electrodes of the display and dummy pixels and the second substrate.

DETAILED DESCRIPTION OF THE INVENTION

Figure 1:
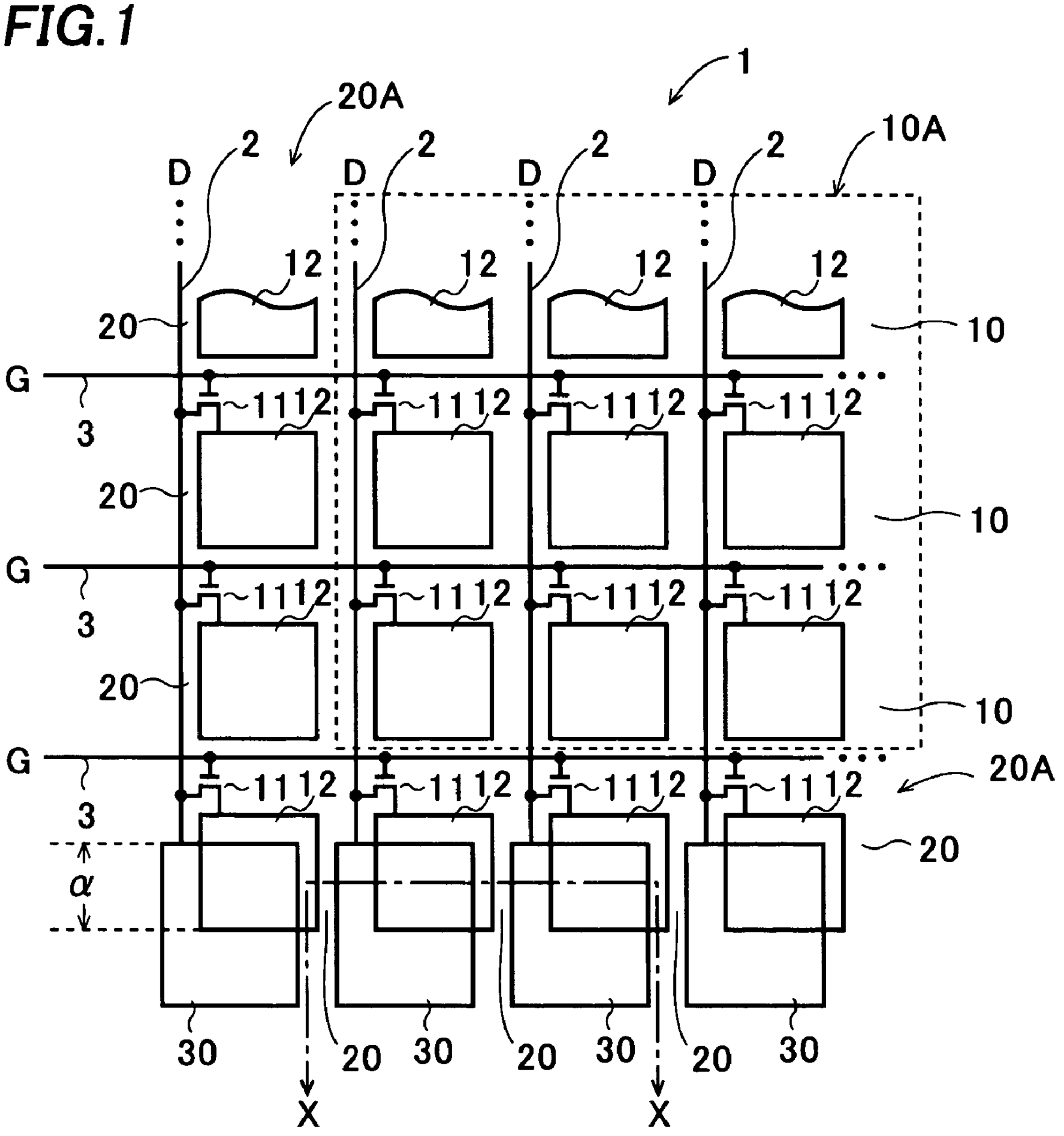
FIG. 1 is a plan view of a liquid crystal display device of an embodiment of the invention, showing a display pixel region and its vicinity.
Figure 2:
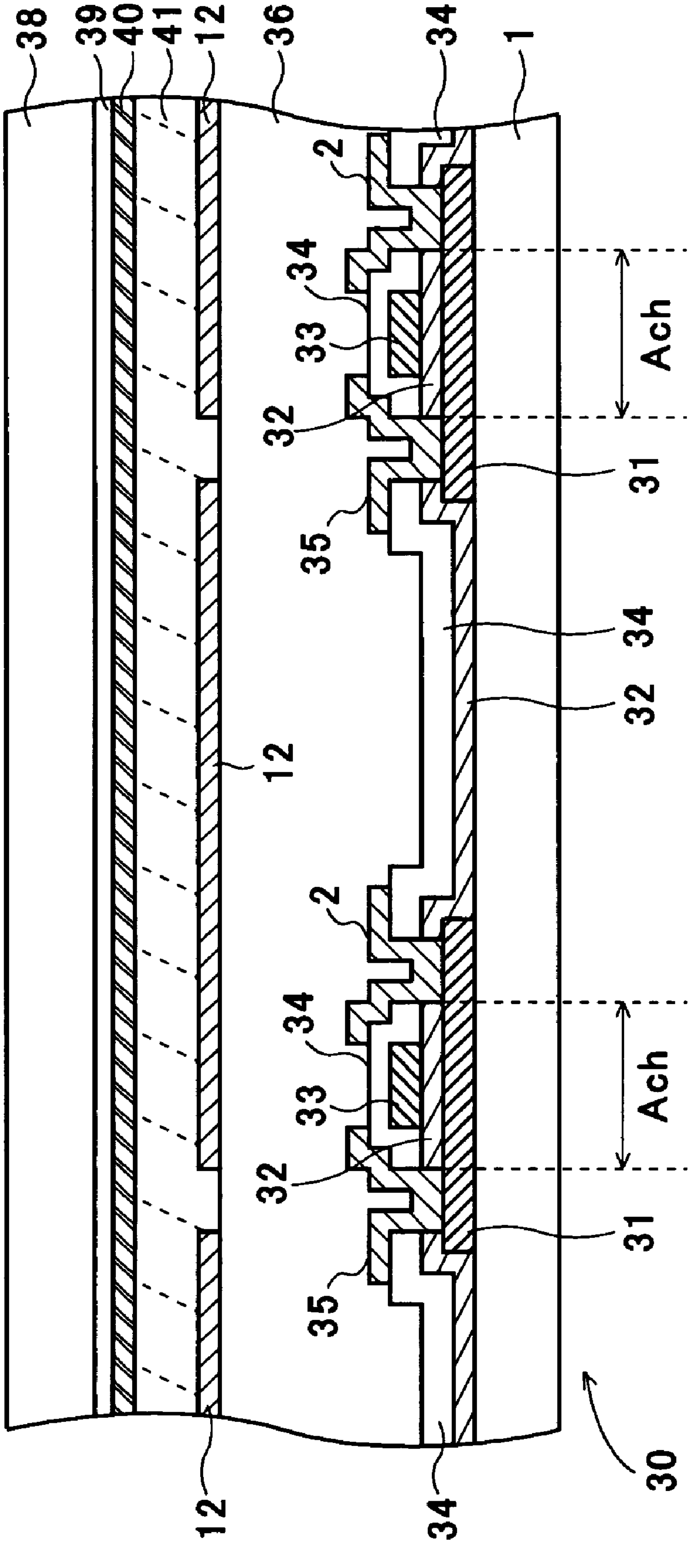
FIG. 2 is a cross-sectional view of FIG. 1 along line X-X.
Figure 3:
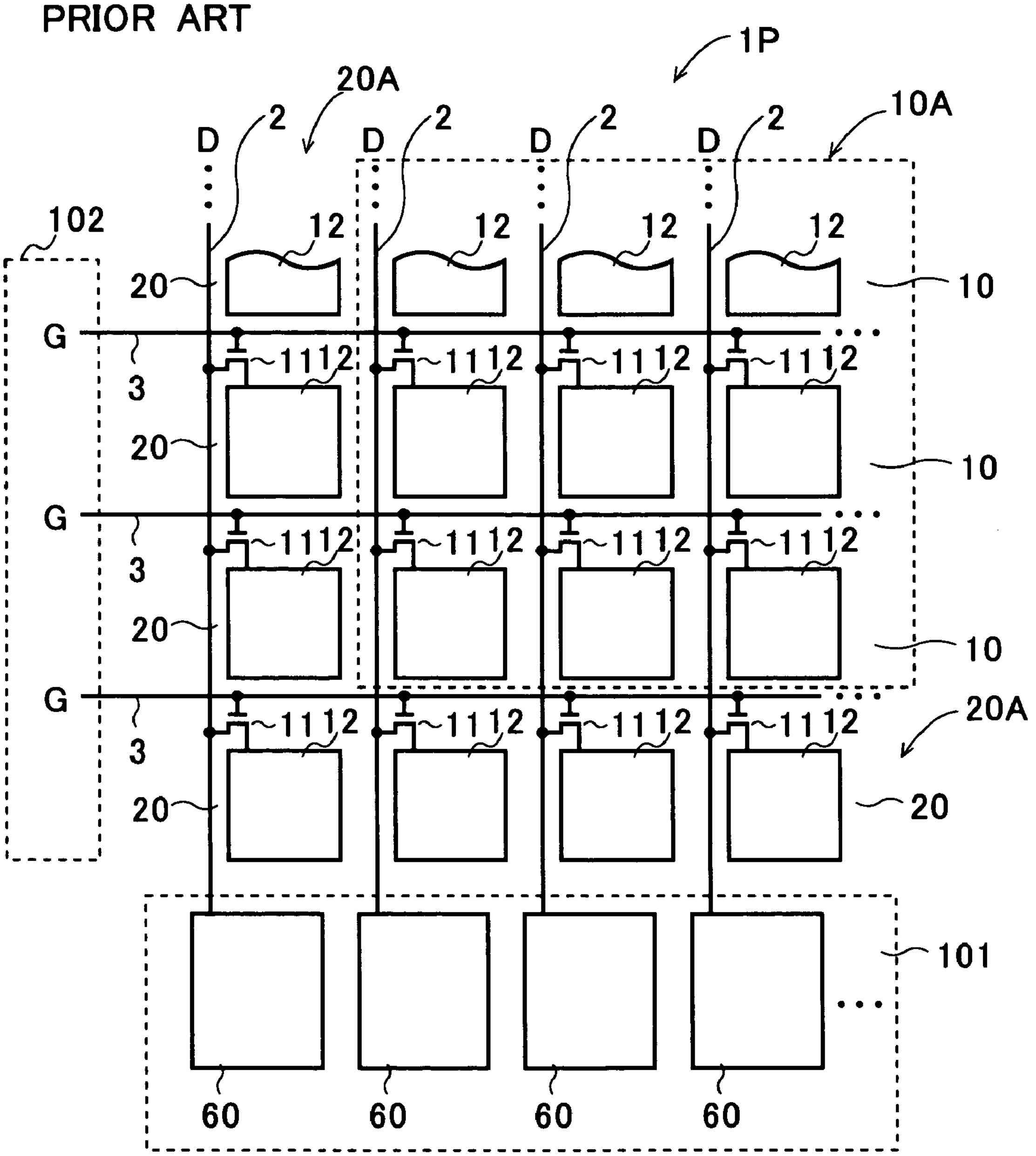
FIG.3 PRIOR ART
FIG. 3 is a plan view of a liquid crystal display device of a conventional art, showing a display pixel region and its vicinity.

A liquid crystal display device of an embodiment of the invention will be described referring to FIGS. 1 and 2. FIG. 1 is a plan view of the liquid crystal display device of this embodiment, showing a display pixel region 10A and its vicinity that will be described below. FIG. 2 is a cross-sectional view of FIG. 1 along line X-X, showing a region where a display pixel 12 of a dummy pixel 20 and a sampling TFT 30 are superposed on each other that will be described below. A description will be given providing the same numerals to the same components in FIGS. 1 and 2 as those of FIG. 3. FIGS. 1 and 2 show some of a plurality of pixels 10 and a plurality of dummy pixels 20 that will be described below.

The display pixel region 10A formed with the plurality of pixels 10 is disposed on a first substrate 1 formed with data lines 2 and scanning lines 3 in a grid form as shown in FIG. 1. A dummy pixel region 20A formed with the plurality of dummy pixels 20 is disposed on the first substrate 1 adjacent to the display pixel region 10A. In this embodiment, the first substrate 1 is a substrate made of a glass.

Driving TFTs supplying a driving signal to pixel selection TFTs 11, i.e, sampling TFTs, 30 are formed being planarly superposed on the pixel electrodes 12 of the dummy pixels 20. This sampling TFT 30 supplies a display signal D that is one of the driving signals to the data line 2. The sampling TFTs 30 are included in a horizontal driving circuit serving as a driving circuit. A vertical driving circuit supplying a pixel selection signal G and including driving TFTs is connected to the scanning lines 3, although not shown.

Next, the pixel electrode 12 of the dummy pixel 20 and the sampling TFT 30 superposed thereon will be described in detail referring FIG. 2.

An active layer 31 of the sampling TFT 30 is formed on the first substrate 1 as shown in FIG. 2. This active layer 31 is made of, for example, a low-temperature polysilicon layer. A gate insulation film 32 made of, for example, a silicon oxide film or a silicon nitride film is formed on the first substrate 1 including on the active layer 31. A gate electrode 33 made of, for example, chromium (Cr) is formed on the gate insulation film 32 above the active layer 31.

An interlayer insulation film 34 made of, for example, a silicon oxide film or a silicon nitride film is formed on the gate insulation film 32 including on the gate electrode 33. Contact holes exposing a portion of the active layer 31 in the drain region and source region are provided in the gate insulation film 32 and the interlayer insulation film 34 above the drain region and the source region of the active layer 31. A drain electrode 35 connected to the drain region and a source electrode 2 connected to the source region are respectively formed on a portion of the active layer 31 through each of these contact holes. Note that in this embodiment the source electrode 2 is part of the data lines 2. Alternatively, the source electrode can be formed independent of the data line 2, and connected to the data line 2 through a contact or the like (not shown) in a certain position (not shown). The source electrode of this embodiment will be referred to as a source electrode 2 as part of the data line 2. The drain electrode 35 and the source electrode 2, i.e. the data line, are made of, for example, aluminum (Al), although not particularly limited to this metal. The data line 2 can be connected to the drain region instead of to the source region of the active layer 31 as the source electrode.

A planarization insulation film 36 made of, for example, a coated oxide film is formed on the interlayer insulation film 34 including on the drain electrode 35 and the source electrode 2. The pixel electrode 12 of the dummy pixel 20 is formed on the planarization insulation film 36. At least a portion of a channel region Ach of the active layer 31 of the sampling TFT 30.(i.e., a region between the drain electrode 35 and the source electrode 2) is superposed on the pixel electrode 12 with the planarization insulation film 36 interposed therebetween. That is, the sampling TFT 30 and the pixel electrode 12 are insulated from each other by the planarization insulation film 36.

Furthermore, a first alignment film (not shown) is formed on the pixel electrode 12. A second substrate 38 (i.e., a glass substrate or the like) is disposed facing the pixel electrode 12 with a spacer (not shown) interposed therebetween. A black matrix 39 shielding the dummy pixel 20 from light is formed on the second substrate 38 on the side facing the pixel electrode 12. A common electrode 40 made of, for example, ITO (Indium Tin Oxide) is formed on the black matrix 39. A second alignment film (not shown) is formed on the common electrode 40. A liquid crystal layer 41 is sealed between the first substrate 1 and the second substrate 38 by the spacer (not shown). An optical retardation plate and a polarizing plate (not shown) are formed on the second substrate 38 on the side not facing the pixel electrode 12.

Accordingly, a portion of the sampling TFT 30 is formed being superposed on the pixel electrode 12 with the planarization insulation film 36 interposed therebetween. Therefore, the area of a frame necessary for forming the sampling TFTs 30 on the first substrate 1 can be reduced by an amount of length α of the portion superposed along the data line 2 in a planar view of the first substrate 1 as shown in FIG. 1, compared with the conventional art. That is, the frame of the liquid crystal display device can be narrowed.

Although the sampling TFT 30 as the driving TFT is formed being superposed on the pixel electrode 12 of the dummy pixel 20 in the described embodiment, the invention is not limited to this structure. That is, the superposing structure of the invention can be modified to include other TFTs that are part of the horizontal or vertical driving circuit.

For example, although not shown, a detection TFT supplying a detection signal for detecting a formation error or disconnection of the data line 2, the scanning line 3, or the pixel electrode 12 in the pixels 10 can be formed being superposed on the pixel electrode 12 of the dummy pixel 20 with a predetermined insulation film interposed therebetween. Furthermore, although not shown, a driving TFT supplying a pixel selection signal G to the scanning line 3 (e.g., a driving TFT included in a vertical driving circuit) can be formed being superposed on the pixel electrode 12 of the dummy pixel 20 with a predetermined insulation film interposed therebetween. In these cases, too, the area of a frame necessary for forming the TFTs on the first substrate 1 can be reduced compared with the conventional art. That is, the frame of the liquid crystal display device can be narrowed.

The structure of the pixel 10 and the dummy pixel 20 of the described embodiment are not limited to the described one. That is, the pixel 10 and the dummy pixel 20 can have the other structures as long as those have structures where the pixel electrode 12 of the dummy pixel 20 and a portion of the channel region of the TFT such as the sampling TFT 30 are superposed on each other with a predetermined insulation film interposed therebetween. For example, the invention can be applied where a reflection metal layer is provided on the pixel electrode 12 to form a so-called reflective liquid crystal display device.

What is claimed is:

1. A liquid crystal display device comprising:

a first substrate;

a plurality of display pixels formed on the first substrate to form a display pixel region, each of the display pixels comprising a pixel selection transistor and a pixel electrode connected with the pixel selection transistor;

a plurality of dummy pixels formed on the first substrate to form a dummy pixel region adjacent the display pixel region, each of the dummy pixels comprising a pixel selection transistor and a pixel electrode connected with the pixel selection transistor and being covered by a black matrix to prevent light emission from the dummy pixels;

a driving transistor formed on the first substrate and supplying a driving signal to the pixel selection transistors of the display pixels, a portion of a channel region of the driving transistor being disposed under part of a pixel electrode of a corresponding dummy pixel;

an insulation film disposed between the driving transistor and the pixel electrodes of the display and dummy pixels;

a second substrate; and a liquid crystal layer disposed between the pixel electrodes of the display and dummy pixels and the second substrate.

2. The liquid crystal display device of claim 1, wherein the driving transistor is a sampling transistor supplying a display signal as the driving signal to the pixel selection transistor.

3. The liquid crystal display device of claim 1, wherein the driving transistor comprises an active layer made of a low-temperature polysilicon layer.

4. The liquid crystal display device of claim 2, wherein the driving transistor comprises an active layer made of a low-temperature polysilicon layer.

* * * * *